Jan. 30, 1940.   I. C. REYNOLDS   2,188,817
DECORATIVE CONTAINER
Filed July 6, 1938
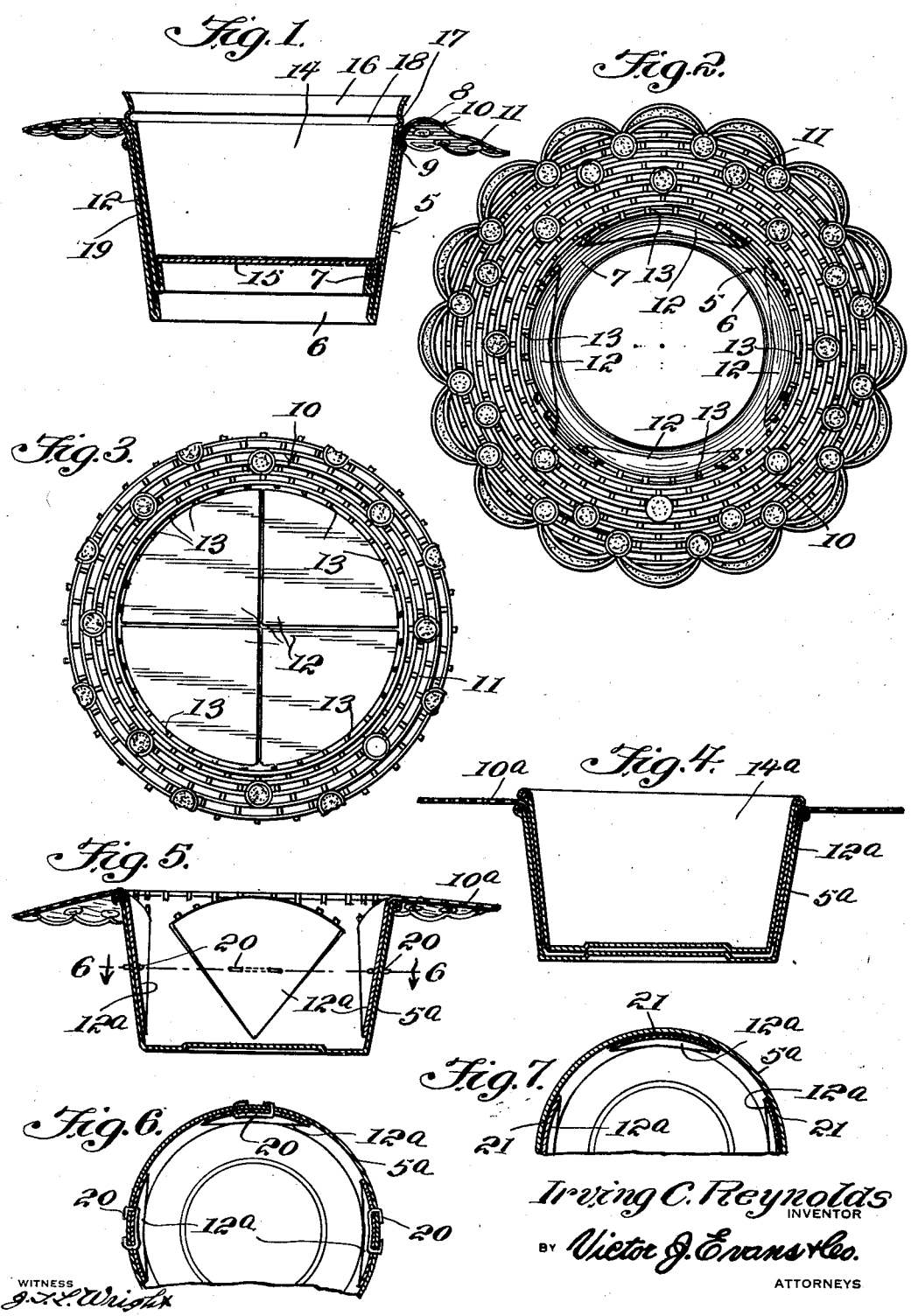
Irving C. Reynolds
INVENTOR
BY Victor J. Evans & Co.
ATTORNEYS Patented Jan. 30, 1940

2,188,817

UNITED STATES PATENT OFFICE 2,188,817

DECORATIVE CONTAINER

Irving C. Reynolds, Toledo, Ohio

Application July 6, 1938, Serial No. 217,746

3 Claims. (Cl. 229—8)

My invention relates to decorative containers and more particularly to decorative containers in which food products, such as ice cream and jellied mixtures, are distributed.

It is now the usual practice of manufacturers of ice cream and similar food products to provide fancy decorative containers for their products. Containers of this character are primarily supplied in instances where it is desired to serve the product within the cup at tables to present an attractive and decorative appearance, for instance at banquets and the like. One of the usual forms consists in a container having a decorative collar attached thereto. This collar is usually fashioned with segments extending into and secured to the interior wall of the container in which the ice cream or other mixture is contained. In this instance the ice cream or similar product, contained within the container and in contact with the attaching segments of the collar, pervates the section of the collar extending exteriorly and about the container thereby resulting in discoloring the same and presenting an untidy and unsanitary appearance. Furthermore, due to this pervation the body of the collar becomes disengaged or broken from the segments.

I overcome these objectionable features, it being one of the principal objects of my invention to provide a container structure having a decorative collar arranged in a manner whereby the same is protected from the discoloring and deteriorating effects of the food product contained therein.

Another object of my invention is to provide a container structure of the class described constructed in a manner to permit like containers to be secured thereto in nested relation, thus effecting an economy in space in the shipping and storage of the same.

A further object of my invention is to provide a container structure of the class described wherein the decorative collar is effectively secured thereto.

A still further object of my invention is to provide a container structure of the class described wherein the collar is secured and maintained about the mouth of a container in a manner to prevent accidental dislodgment therefrom and to present a neat and attractive appearance.

Other objects and advantages will be apparent from the following description, appended claims and annexed drawing.

Referring to the drawing wherein like reference characters designate like parts throughout the several views:

Fig. 1 is a vertical sectional view of my invention.

Fig. 2 is a top plan view thereof.

Fig 3 is a fragmentary top plan view illustrating the collar before attachment to the container.

Fig. 4 is a vertical sectional view of a modified form.

Fig. 5 is a vertical sectional view of another modification.

Fig. 6 is a sectional view taken on the line 6—6 of Figure 5.

Fig. 7 is a fragmentary transverse sectional view of a modified form of attaching the collar to the container.

In practicing my invention, in the preferred embodiment illustrated in Figures 1 to 3 inclusive, I provide a container 5 of a substantially inverted frustrum shaped configuration having an opened bottom fashioned with an interiorly folded section 6 engaging an interior wall 7 of the container. The container is fashioned at the upper end thereof with a mouth 8 having a subjacent offset rim 9. A collar 10 having an outwardly and circumferentially extending section 11 and formed with oppositely disposed segmented sections 12 is attached to the container 5 in a manner hereinafter described. The segmented sections 12, as illustrated in Figure 3, at the jointure thereof with the section 11, are partly severed from said section 11 to form fold sections 13. The sections 12 are folded downwardly on the fold sections 13 and engage the interior wall 7 of the container, the section 11 extending laterally about the mouth 8.

Within the container 5 a cup or container 14 is positioned, said container having a closed bottom 15 and an open mouth 16 formed with a subjacent circumferentially extending rim 17 providing a channel 18 for receiving a disk (not shown) to close said mouth. The container 14 is adapted to contain ice cream or a similar food product and the exterior wall 19 thereof engages the sections 12 of the collar and coacts with the interior wall 7 of the container 5 to maintain the sections 12 in clamped position between the walls 7 and 19 thereby securing the collar 10 in fixed position relative to the container 5. The rim 17 coacts with the upper face of the mouth 8 to maintain the collar 10 in fixed position about the mouth 8 and prevent accidental dislodgment of the same therefrom. In this manner the section of the container 14 above the rim 17 prevents the contents of the container from contacting the collar, thereby eliminating discoloration and deterioration which would obtain in the evident of such contact.

From the foregoing it will be apparent that in shipping or storing the containers 5 together with the collars 10, a number of the same may be nested together in the same manner that the container 14 is inserted in the container 5. The folded section 6 of the container 5 limits the insertion of a container and thereby prevents the mouth thereof from assuming a position subjacent the mouth of the container 5, thus preventing the contents of the inserted container from accidental contact with the collar while the said contents are being consumed.

In the modified form illustrated in Figure 4, both of the containers 5a and 14a are of a similar construction, both being provided with closed bottoms and rimmed mouths. This construction permits of the use of one type of container and the sections 12a of the collar 10a are inserted therebetween in the same manner as in the preferred embodiment.

In shipping and storing the containers 5, having the collars 10 positioned thereon, the collars often become disengaged therefrom. In order to overcome this undesirable feature, means is provided whereby the lower ends of the sections 12 are affixed to the interior wall of the container. However, it is to be distinctly understood that this means only affords a temporary or auxiliary affixing of the sections 12 to the container and does not function to maintain the collar about the mouth 8 when another container has been inserted. The inserted container coacts with the interior wall of the container 5 to maintain the collar about the upper face of the mouth 8. One form of securing the sections 12 in the above described manner is illustrated in Figures 5 and 6 wherein the sections 12 are secured to the interior wall by means of staples 20. Another form, illustrated in Figure 7, consists of securing the ends of the sections 12 to the interior wall 7 by means of glue 21 or cement.

While I have shown and described my invention as being particularly adaptable for use in connection with the serving of ice cream and the like, it is to be distinctly understood that other products may be used, for instance candied fruits, nuts and gelatin.

What I claim is:

1. In a container structure, a hollow body having an interior wall terminating in a mouth at one end and a bottom having a folded section at the other end, and a collar associated with said body and formed with a circumferentially and outwardly disposed section extending about said mouth and with an angularly disposed section relative to said first mentioned section extending into said mouth and engaging said wall, a similar body arranged in said first mentioned body and having an outer wall coacting with the inner wall of said first mentioned body to maintain said collar fixed therebetween and said outwardly disposed section in position about said mouth, said similar body having a bottom portion resting on said folded section to position the mouth of said similar body above said collar.

2. In a container structure, a hollow body having an inner wall terminating in a mouth, and a collar associated with said body and formed with a circumferentially and outwardly disposed section extending about said mouth in substantial horizontality with respect to the vertical axis of said body and with an angularly disposed section relative to said first mentioned section extending into said mouth and engaging said wall, said body adapted to receive a similar body in a manner whereby the outer wall of said similar body coacts with the inner wall of said first mentioned body to maintain said collar in position about said mouth.

3. In a container structure, the combination of a hollow body having an interior wall terminating in a mouth, of a collar engaging said wall and having a section extending over said mouth in substantial horizontality with respect to the vertical axis of said body and circumferentially about the mouth, of a similar body as said first mentioned body and having an exterior wall coacting with said interior wall to maintain said collar in fixed position about the mouth of said first mentioned body.

IRVING C. REYNOLDS.